Dec. 21, 1965  F. LECROART  3,225,328
TRANSPORTABLE SEISMOGRAPH
Filed April 10, 1962

INVENTOR
FRANÇOIS LECROART
BY Bacon & Thomas
ATTORNEYS

United States Patent Office 3,225,328
Patented Dec. 21, 1965

3,225,328
TRANSPORTABLE SEISMOGRAPH
François Lecroart, Paris, France, assignor to Commissariat a l'Energie Atomique, Paris, France
Filed Apr. 10, 1962, Ser. No. 186,438
Claims priority, application France, Apr. 24, 1961, 859,628
3 Claims. (Cl. 340—17)

The present invention relates to a transportable seismograph having small dimensions, and particularly to an apparatus comprising a heavy lever subjected to a return force and adapted for pivotal movement about a horizontal axis, a coil disposed at one of the ends of the lever being movable in the magnetic field of a permanent magnet, the voltage obtained at the ends of the said coil constituting the output voltage of the seismograph.

Known apparatus of this type are relatively bulky and when transporting them it is necessary to employ extensive precautions. Frequently this transport necessitates the complete disassembly of the apparatus.

The invention has for an object a seismograph of small dimensions, the fragile members of which are easily protectable under the usual conditions of transporting, and which is moreover easy to adjust rapidly and convenient in use.

The invention consists in providing the end of the lever opposite to the coil with two pivots which are symmetrically located with respect to the vertical plane of the lever, said pivots resting on fixed bearings which are fast with the frame of the apparatus and determining the horizontal pivot axis of the lever, and in providing means for moving the lever progressively toward the vicinity of its axis of oscillation and to lock it in a position in which the pivots are cleared from the fixed bearings.

The invention also provides other secondary features which will become apparent from the following description.

In order that the invention may be more clearly understood, reference will now be made to the accompanying drawings which show one embodiment thereof by way of example and in which.

Figure 1:
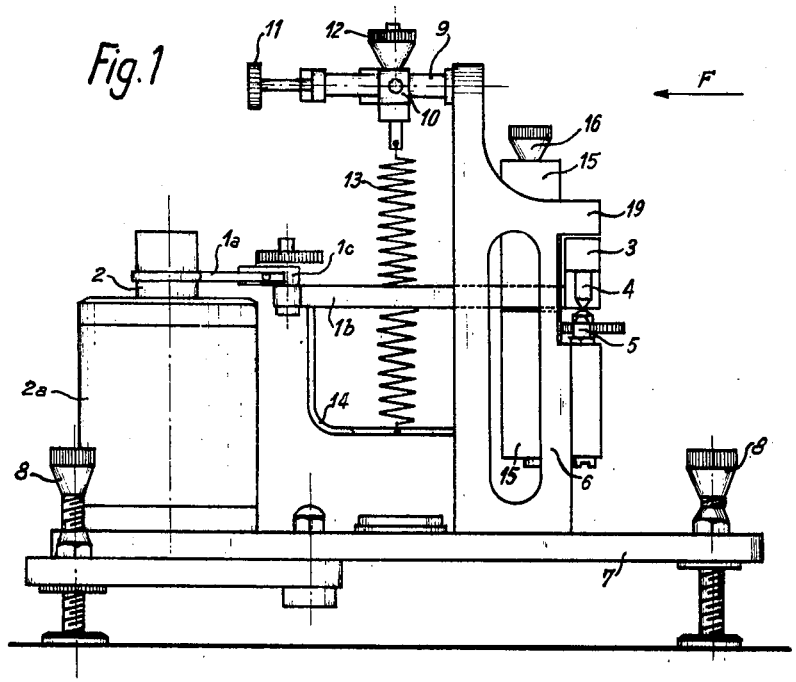
FIG. 1 shows a front view of a seismograph according to the invention.

Referring to the drawings, FIG. 1 shows the lever for the apparatus as referred to above which comprises two separate parts, 1a and 1b, connected together by a toggle joint 1c. This lever supports at one of its ends a coil 2 which is displaceable in the pot of a permanent magnet 2a. The part 1b of the lever has the shape of a fork, the two limbs of which are separated in the vicinity of the toggle joint 1c, and are approximately parallel along part of their length. At the joined ends of the limbs, there is secured a horizontal member 3 carrying at each of its ends a pivot 4 having a vertical axis. The apparatus being ready to operate, the pivots 4 rest on corresponding thrust bearings 5. The latter are fast with a frame 6 secured to the base 7 of the apparatus. The axis of rotation of the lever determined by the two pivots may be set up exactly horizontally by moving the regulating screws 8 which support the base at three points. The horizontal condition may be verified by using a spirit level (not shown), secured to the base.

The supporting frame 6 carries two horizontal rods 9 which are located on each side of the symmetrical longitudinal plane of the apparatus. These two rods serve as a guideway for a double collar 10, the position of which along the rods may be adjusted by turning the knurled screw 11, and locked by movement of the screw 12. The collar serves as the upper fixing point for a pre-stressed helical tension spring 13. This spring has an approximately vertical axis and passes between the two limbs of the fork 1b. It acts on the lever through the rod 14 located therebelow and in the plane of symmetry of the apparatus. Loading masses 15 may be displaced on the part 1b of the lever; the two limbs of the fork serve as a guide-way so as to maintain an equal distribution of the masses on each side of the plane of symmetry of the apparatus. A screw 16 allows the masses 15 to be kept fast with the part 1b when the adjustment of the apparatus is completed.

In operation, the lever of the apparatus is in equilibrium about the horizontal axis determined by the two pivots located at the extremity of the part 1b. It is subjected on one hand to the forces of gravity and inertia acting principally on the masses 15, and on the other hand to the return force exerted by the spring 13. For adjusting the apparatus, the position of the masses 15 having been chosen as a function of the shock which it is proposed to record, the screw 11 is rotated until equilibrium of the lever is obtained. The movement of the latter are recorded by using the output voltage of the coil 2 which passes more or less deeply into the pot of the permanent magnet 2a secured to the base 7. The toggle joint 1c allows the position of the coil in the pot to be adjusted.

Figure 2:
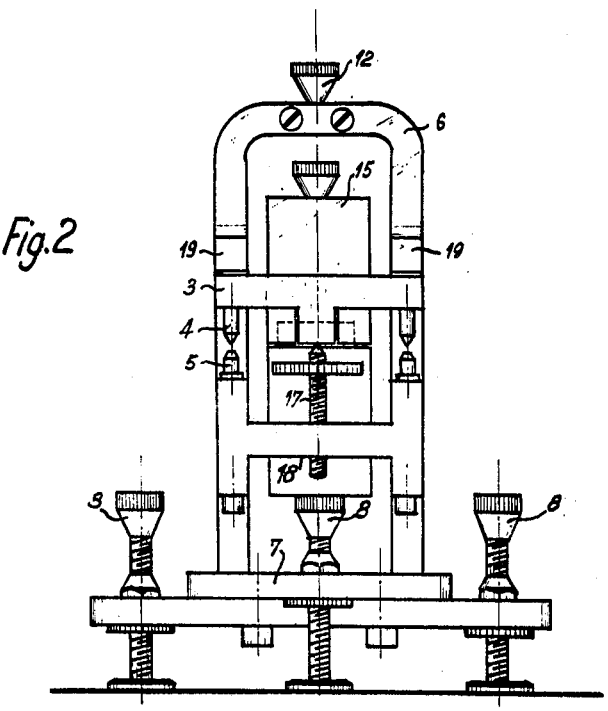
FIG. 2 shows a side view thereof.

FIG. 2 is a side view in the direction of the arrow F shown in FIG. 1. The same reference numerals are used to designate the same members in the two figures. In FIG. 2 there can be seen in particular the member 3 carrying at its two ends the pivots 4. In operation, as has already been set out, the pivots rest on the bearings 5. For transporting the apparatus, the part 1b of the lever may be applied against a plane abutment constituted by two extensions 19 of the supporting frame 6 by means of a screw 17 which may be turned in a thread 18 formed in the frame 6. In this position the lever will be completely locked and the pivots 4 are cleared from the fixed bearings 5. It will be apparent that in these conditions the apparatus may easily be transported without risk of any damage.

After the transportation has been completed, it is sufficient to adjust the horizontality of the base by rotating the screw 17 in order to replace the apparatus into the operating conditions similar to those pertaining before transportation. In general, it will be sufficient to use a slight corrective re-adjustment to re-take a set of measurements in identical conditions to those of the series of measurements effected before the transportation.

What is claimed is:

1. A transportable seismograph, comprising: a stationary frame, heavy lever means, means for pivotally mounting said lever means at one end thereof on said frame about a horizontal axis, said pivotal means including two spaced-apart pivots fast with said one end of said lever and symmetrically located with respect to the vertical midplane of said lever means and fixed bearing means rigid with said frame for receiving said pivots; said pivots being readily separable from said fixed bearing means upon vertical movement of said one end of said lever means; resilient return means on said frame and engaging said lever means for biasing said lever toward a rest position; means on said frame for creating a magnetic field; a coil carried by said lever at the end thereof opposite said pivotal means for movement in said magnetic field; and optionally actuatable means for engaging and moving said one end of said lever means toward a predetermined abutting position where said pivots are clear from said fixed bearing means.

2. A transportable seismograph, comprising: a stationary frame, heavy lever means, means for pivotally mounting said lever means at one end thereof on said frame about a horizontal axis, said pivotal means including two spaced-apart pivots fast with said one end of said lever and symmetrically located with respect to the vertical midplane of said lever means and fixed bearing means rigid with said frame for receiving said pivots; said pivots being readily separable from said fixed bearing means upon vertical movement of said one end of said lever means; resilient return means on said frame and engaging said lever means for biasing said lever toward a rest position; means on said frame for creating a magnetic field; a coil carried by said lever at the end thereof opposite said pivotal means for movement in said magnetic field; abutment means rigid with said frame and spaced vertically with respect to said lever means adjacent said one end thereof for receiving said lever means in abutting engagement therewith; and optionally actuatable means for engaging and moving said one end of said lever means from said fixed bearing means and into engagement with said abutment means for locking said lever means to said frame with said pivots clear from said fixed bearing means.

3. A transportable seismograph comprising a stationary frame, heavy lever means, means for pivotally mounting said lever means at one end thereof on said frame about a horizontal axis, said pivotal means including two spaced-apart pivots fast with said one end of said lever and symmetrically located with respect to the vertical midplane of said lever means and fixed bearing means rigid with said frame for receiving said pivots; resilient return means on said frame and engaging said lever means for biasing said lever toward a rest position, means on said frame for creating a magnetic field, a coil carried by said lever at the end thereof opposite said pivotal means for movement in said magnetic field, said lever means being formed of two parts and an adjustable toggle joint being provided between said two parts of the lever means connecting said two parts together, one of said parts carrying said coil and the other of said parts carrying said pivots, and optionally actuatable means for engaging and moving said one end of said lever means toward a predetermined abutting position where said pivots are clear from said fixed bearing means.

References Cited by the Examiner
UNITED STATES PATENTS

| | | | |
|---|---|---|---|
| 1,784,415 | 12/1930 | Benioff | 340—17 |
| 1,789,055 | 1/1931 | Taylor | 340—17 |
| 2,933,715 | 4/1960 | Beuermann | 340—17 |

OTHER REFERENCES

"The Galitzin Seismographs," Engineering (a British publication), April 13, 1923, pp. 475–476.

BENJAMIN A. BORCHELT, *Primary Examiner.*

KATHLEEN CLAFFY, SAMUEL FEINBERG,
*Examiners.*

J. W. MILLS, G. H. GLANZMAN, *Assistant Examiners.*